United States Patent [19]

Imanaka et al.

[11] 4,110,411
[45] Aug. 29, 1978

[54] POLYESTER COPOLYMER COMPOSITIONS

[75] Inventors: Hiroshi Imanaka; Yoshihiko Kijima; Chikara Sugitawa; Misao Sumoto, all of Otsu, Japan

[73] Assignee: Toyo Boseki Kabushiki Kaisha, Osaka, Japan

[21] Appl. No.: 662,283

[22] Filed: Feb. 27, 1976

[30] Foreign Application Priority Data

Feb. 27, 1975 [JP] Japan .................................. 50-24738

[51] Int. Cl.$^2$ ............................................. C08L 67/06
[52] U.S. Cl. .................................. 260/873; 260/876 B
[58] Field of Search ................ 260/873, 876 B, 75 R

[56] References Cited

U.S. PATENT DOCUMENTS

| | | | |
|---|---|---|---|
| 3,223,752 | 12/1965 | Tate et al. ............................ | 260/873 |
| 3,236,266 | 3/1976 | Hoeschele ........................... | 260/75 R |
| 3,256,362 | 6/1966 | Craubner et al. ................ | 260/873 X |
| 3,297,784 | 1/1967 | Snedeker et al. .................... | 260/837 |
| 3,701,755 | 10/1972 | Sumoto et al. ..................... | 260/75 R |
| 3,723,568 | 3/1973 | Hoeschele ...................... | 260/75 R X |
| 3,723,569 | 3/1973 | Hoeschele ...................... | 260/75 R X |
| 3,763,109 | 10/1973 | Witsiepe ............................. | 260/75 R |
| 3,766,146 | 10/1973 | Witsiepe ............................. | 260/75 R |
| 3,769,260 | 10/1973 | Segal ................................. | 260/873 X |
| 3,775,375 | 11/1973 | Wolfe ................................. | 260/75 R |
| 3,784,520 | 1/1974 | Hoeschele ........................... | 260/75 R |
| 3,832,314 | 8/1974 | Hoh et al. ...................... | 260/75 R X |
| 3,835,089 | 9/1974 | Fox et al. ........................ | 260/873 X |
| 3,843,752 | 10/1974 | Katayama et al. ................... | 260/873 |
| 3,849,515 | 11/1974 | Muller ........................... | 260/75 R X |
| 3,864,315 | 2/1975 | Ohno et al. ........................ | 260/75 R |
| 3,954,689 | 5/1976 | Hoeschele ...................... | 260/75 R X |
| 4,013,624 | 3/1977 | Hoeschele ........................... | 260/75 R |

*Primary Examiner*—Thomas De Benedictis, Sr.
*Attorney, Agent, or Firm*—Birch, Stewart, Kolasch and Birch

[57] ABSTRACT

A composition comprising an intimate mixture of a segmented thermoplastic polyester copolymer and at least one polyolefin. This composition is improved in recovery from creep at high temperature as well as in ease of hot cutting and adhesion.

10 Claims, No Drawings

POLYESTER COPOLYMER COMPOSITIONS

BACKGROUND OF THE INVENTION

Segmented thermoplastic polyester copolymers are known as a elastic material with improved mechanical properties and heat resistance. Particularly, their heat resistance is characteristic. Generally, no thermoplastic elastomer other than segmented thermoplastic polyester copolymers can be employed at elavated temperatures as high as 120° C or greater.

For example, reference is made to the bottling of foodstuffs. After the bottling and sealing, each foodstuff in a bottle is usually sterilized at elevated temperatures. Thermal properties of a bottle crown liner are critical during the sterilizing treatment. If a material for the crown liner is poor in heat resistance, the crown liner is so deformed by the application of heat as to break the air-tightness required between the bottle top and the crown liner. While segmented thermoplastic polyester copolymers seem to be a useful lining material due to their excellent heat resistance, it has been found that such segmented polyester copolymers still have some drawbacks. The crown cap is provided with a liner on the inner side thereof by extruding a molten resin as a strand in shape, cutting the molten strand into molten particles, applying molten particles on the inner side of the crown cap, and press molding the molten particles therein. The strand should be cut before it solidifies. The inventors have found that a strand made of molten, segmented thermoplastic polyester copolymer can not be easily cut, that is to say, a segmented thermoplastic polyester copolymer cannot be easily cut while hot. The strand made of the segmented polyester copolymer can not be completely cut into particles because of stringing between each particle. This may bring about reduction in the operating efficiency of the copolymer during molding. Furthermore, we have found that the segmented thermoplastic polyester copolymer is not adhesive enough, particularly to metal. In practice, most segmented polyester copolymers may not be applied to metal or any other material as a coating because such a coating is easily stripped or peeled.

On the other hand, it is known that polyolefins exhibit poor heat resistance and adhesion, as well as low environmental stress cracking resistance. The latter results from the fact that there remains a comparatively larger residual strain in a molded piece of polyolefin, which gives the differences in coefficient of thermal expansion between different locations when exposed to a certain liquid or vapor thereof, causing cracks in the molded piece.

OBJECTS OF THE INVENTION

It is therefore a primary object of the present invention to provide an elastomer improved in recovery from creep at high temperature.

Another object of the present invention is to provide a composition including a segmented thermoplastic polyester copolymer which has improved hot cutting properties that determine the operational efficiency during the molding of a liner, packing or the like.

Still another object of the present invention is to provide a composition including a segmented thermoplastic polyester copolymer which is improved in adhesion, particularly to metal.

A further object of the present invention is to improve the environmental stress cracking resistance of a composition including a polyolefin.

SUMMARY OF THE INVENTION

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The foregoing objects and others are accomplished in accordance with the present invention, generally speaking, by providing a composition which comprises an intimate mixture of (a) a segmented thermoplastic polyester copolymer and (b) at least one polyolefin.

The composition of the invention is a resin compound particularly useful as a lining, packing, sealing, coating or any other molding material.

The term "segmented thermoplastic polyester copolymer" includes a family of block copolymers of (1) high-melting hard segments of a polyester; and (2) low-melting soft segments of a polymer.

The high-melting polyester segment should be composed of a component that can singly form a high polymer having a melting point of more than 150° C. The low-melting polymer segment should have a molecular weight between 400 and 6,000 and should be composed of a component that has a melting or softening point of less than 80° C.

Examples of both components of the hard and soft segments are described below, respectively.

The component which may constitute the high-melting hard polyester segment includes by way of example, polyesters prepared from an aromatic dicarboxylic acid such as terephthalic acid, isophthalic acid, 1,5-naphthalene dicarboxylic acid, 2,6-naphthalene dicarboxylic acid, 4,4'-diphenyl dicarboxylic acid, bis(4-carboxyphenyl)methane, bis(4-carboxyphenyl)sulfone, etc. or an ester thereof and a diol such as ethylene glycol, propylene glycol, tetramethylene glycol, pentamethylene glycol, 2,2-dimethyltrimethylene glycol, hexamethylene glycol, decamethylene glycol, p-xylylene glycol, cyclohexane dimethanol etc.;

copolyesters prepared by use of at least two dicarboxylic acids selected from the foregoing or at least two diols selected from the foregoing;

polyesters derived from p-($\beta$-hydroxyethoxy)benzoic acid, p-hydroxybenzoic acid or an ester thereof;

polylactones such as polypivalolactone;

polyether esters prepared from an aromatic ether dicarboxylic acid such as 1,2-bis(4,4'-dicarboxyphenoxy) ethane, etc. and a diol selected from the foregoing;

copolyesters comprising a combination of dicarboxylic acids, hydroxy acids and diols described above; and the like.

Among them is preferred a polyester derived from terephthalic acid as a dicarboxylic acid and ethylene glycol or tetramethylene glycol as a diol because of its improved physical properties.

The component which may constitute the low-melting soft polymer segment having a molecular weight between 400 and 6,000 includes by way of example, polyalkylene ether glycols such as poly(ethylene oxide) glycol, poly(propylene oxide) glycol, poly(tetramethylene oxide) glycol, etc. and mixtures thereof; and copolyether glycols obtained by copolymerizing monomers of the above-described polyethers.

In addition, polyesters prepared from an aliphatic dicarboxylic acid having 2 to 12 carbon atoms and an aliphatic glycol having 2 to 10 carbon atoms, which include, for example, polyethylene adipate, polytetramethylene adipate, polyethylene sebacate, polytetramethylene dodecanate, polytetramethylene azelate, etc. may be employed. Polylactone such as poly-ε-caprolactone and poly-δ-valerolactone may be also employed. Polyester-polyether copolymers comprising a combination of a polyester and a polyether each selected from the foregoing may also be employed.

Among them is preferred a polyether, particularly poly(tetramethylene oxide) glycol because the resultant composition exhibits excellent physical properties at low temperature.

The low-melting polymer segment is preferably included in an amount from 5% to 80% by weight of the segmented polyester copolymer.

The segmented thermoplastic polyester copolymer, ie., the polyester block copolymer may be prepared in a conventional condensation polymerization process. By way of illustration, in a first preferred process, a mixture of an aromatic dicarboxylic acid or a dimethyl ester thereof, a low-melting polymer segment-forming diol and a low-molecular weight diol is heated at a temperature from about 150° C to 260° C in the presence of a catalyst. While water or methanol formed during the condensation polymerization or the ester exchange reaction is removed, the produced prepolymers are copolymerized into a polyester copolymer having a high polymerization degree by heating the prepolymers in vacuo to remove the excess low-molecular weight diol. In a second preferred process, previously formed prepolymers capable of forming a high-melting polyester segment and a low-melting polymer segment, respectively, are mixed and allowed to react with a bifunctional compound capable of reacting with terminal functional groups of the above two prepolymers. After the reaction system is evacuated to remove the volatile components, there is obtained a polyester copolymer. In a third preferred process, a high-melting polyester having a high polymerization degree and lactone monomer are mixed with heating. The ring opening polymerization of lactone and the ester exchange reaction give a polyester copolymer. Any alternative process may be used to prepare the desired polyester block copolymer.

The polyolefin which may be mixed in the composition of the present invention includes by way of example, polyethylene, ethylene-vinyl acetate copolymers (including 5 to 45 wt% of vinyl acetate), polypropylene, polybutylene, polyethylenepolypropylene copolymers, poly-4-methylpentene-1, etc. The melt index of the polyolefin used herein is usually in the range of 0.1 to 50, particularly in the range of 0.1 to 5 for the blow molding and extrusion molding or in the range of 0.3 to 20 for the hot cutting. While the melt index is usually measured at a temperature of 190° C, polyolefins having a melting point of more than 190° C may be subjected to measurement of the melt index at a higher temperature. In the latter case, values of the melt index should be in lower parts of the above-described range.

According to the present invention the segmented thermoplastic polyester copolymer and the polyolefin may be mixed in a widely varying ratio depending on the desired manner of application. The elastic recovery from creep at high temperature will further be improved when the polyolefin is included in an amount from 1 to 50 wt%. The melt viscosity will be enough for the blow molding when the polyolefin is included in an amount of more than 15 wt%. In order to obtain the satisfactory environmental stress cracking resistance the polyolefin should be included in an amount of less than 98 wt%. The adhesion will be more improved when the polyolefin is included in an amount from 1 to 98 wt%. Consequently, the polyolefin is preferably included in an amount from 1 to 50 wt%, more preferably from 15 to 50 wt%, in order to provide the resultant composition with adequate characteristics.

The intimate mixture of the segmented thermoplastic polyester copolymer and the polyolefin may be obtained by mixing them in any suitable extruder or kneader such as a kneading roll, Banbury mixer, etc.

The composition comprising the above-described intimate mixture according to the present invention may also include additives such as carbon black, fillers, pigments, antioxidants, ultraviolet light absorbers, lubricants, anti-static agents etc.

DESCRIPTION OF THE PREFERRED EMBODIMENTS

The present invention is further illustrated in the following examples which are set forth as a further description of the invention.

Physical properties referred to in the examples are measured in accordance with the following Standards or procedures.

(1) Compression deformation and Recovery from deformation: ASTM D 621.
(2) Tensile Strength and elongation: JIS K 6301.
(3) Tensile modulus: JIS K 6911.
(4) Permanent Tensile Elongation: JIS K 6301.
(5) Bending modulus: JIS K 6911.
(6) Hardness: ASTM D 2240.
(7) Izot impact test (notched): JIS K 6911.
(8) Melt Index: ASTM D 1238.
(9) Adhesion: JIS K 6301
(10) Ease of Hot Cutting:

An extruder having a die of 40 mm in diameter is equipped with a hot-cutting means, for example, a rotary cutter. A strand of molten polymer emitted from the extruder is cut by the rotary cutter. Each strand is graded in terms of ease of cutting on this rotary cutting in accordance with the predetermined standard. If a strand of molten polymer is easily cut without stringing between cut particles thereof, this specimen is rated as "5". If a strand is cut with difficulty because of troublesome stringing between cut particles, this is rated as "1". Each specimen may be classified within this five-grade scale.

(11) Environmental Stress Cracking Resistance: JIS Z 1706.

The standard solution for the environmental stress cracking test, Igepal (trade mark, manufactured by I. G. Farbenindustrie A.G.), is replaced with Penerol-N-100 (trade mark of an alkylphenol-poly(ethylene oxide) glycol ether having a similar molecular structure as that of the standard, manufactured by Matsumoto Yushi Co., Ltd). Test pieces are maintained in a solution of 20% Penerol-N-100 at 50° C and subjected to stress.

Polyolefins used in the following examples are listed in Table 1.

Table - 1

|  |  | Trade mark |  | Melt Index | Specific gravity | Manufacturer |
|---|---|---|---|---|---|---|
| Polyethylene | A | Sumikathene | F208-1 | 1.5 | 0.924 | Sumitomo Chemicals Co. |
| " | B | " | G801 | 20 | 0.920 | " |
| " | C | " | G808 | 50 | 0.919 | " |
| " | D | Hi-zex | 2100J | 6.5 | 0.957 | Mitsui Petroleum Chemicals Co. |
| Polypropylene | A | Noblen | W101 | 8 | 0.90 | Sumitomo Chemicals Co. |
| " | B | " | S101 | 1 | 0.90 | " |
| Polybutylene | A* |  | — | 1.8 | 0.915 | — |

*polybutene - 1

The length of time until 50% of the test pieces have been broken is measured.

Segmented thermoplastic polyester copolymers used in the following examples are listed below. The term "parts" means parts by weight.

Copolymer A: a block copolymer prepared by copolymerizing 1,360 parts of dimethyl terephthalate, 1,100 parts of 1,4-butane diol and 1,050 parts of poly(tetramethylene oxide) glycol having a molecular weight of about 1,000 has a melting point of 205° C (crystal) and a reduced viscosity of 2.00 ($\eta$ sp/c; solvent: a mixed solvent of phenol/tetrachloroethane (6/4), concentration of the copolymer: 0.2g/100c.c., temperature: 30° C).

Copolymer B: A block copolymer prepared by copolymerizing 2,900 parts of dimethyl terephthalate, 2,030 parts of 1,4-butane diol and 1,050 parts of poly(tetramethylene oxide) glycol having a molecular weight of about 1,000 has a melting point of 215° C (crystal) and a reduced viscosity of 1.60.

Copolymer C: A block copolymer prepared by copolymerizing 1,300 parts of dimethyl terephthalate, 1,000 parts of ethylene glycol and 1,050 parts of poly(tetramethylene oxide) glycol having a molecular weight of about 1,000 has a melting point of 225° C (crystal) and a reduced viscosity of 1.80.

Copolymer D: A block copolymer prepared by reacting 400 parts of polyethylene terephthalate (molecular weight: 25,000, acid value: 2.3 equiv./$10^6$g) with 600 parts of ε-caprolactone at 230° C for 3 hours has a melting point of 200° C and a reduced viscosity of 1.75. An average molecular weight of the soft segment, ie., the polylactone component is 1,100.

Copolymer E: A block copolymer prepared by copolymerizing 780 parts of dimethyl terephthalate, 540 parts of 1,4-butane diol and 1,980 parts of poly(tetramethylene oxide) glycol having a molecular weight of about 2,000 has a melting point of 185° C (crystal) and a reduced viscosity of 3.0.

EXAMPLES 1-3

A blend of copolymer A and polyethylene A in the amounts set forth in Table 2 was kneaded in a kneading-and-melting extruder of screw type (die diameter 40 mm, L/D 24) at 240° C and then the resulting compound was pelletized. Test pieces available for the respective tests were formed, respectively, by injection molding under the following conditions.

Cylinder temperature; 240° C
Mold temperature; 40° C
Injection pressure; 500 kg/cm$^2$
Injection time; 20 sec
Cooling time; 20 sec Test pieces were subjected to measurements of various physical properties, respectively.

On the other hand, for the evaluation of the ease of hot cutting, pellets of the compound are molten again in an extruder. The molten compound is then extruded into a hot strand, which is cut by a hot cutting means equipped to the extruder. The results are shown in Table 2.

Table - 2

|  |  | Example | | | Comparative Example | | |
|---|---|---|---|---|---|---|---|
|  |  | 1 | 2 | 3 | 1 | 2 | 3 |
| Copolymer A | part by weight | 100 | 100 | 100 | 100 | 100 | 0 |
| Polyethylene A | part by weight | 5 | 11 | 25 | 0 | 120 | 100 |
| Surface hardness | Shore D | 47 | 48 | 48 | 47 | 47 | 47 |
| Tensile strength | kg/cm$^2$ | 320 | 300 | 202 | 323 | 80 | 120 |
| Elongation | % | 700 | 690 | 670 | 730 | 600 | 520 |
| Compression deformation* (90° C) | % | 6.4 | 6.5 | 8.3 | 6.2 | fractured | 22.7 |
| Recovery from deformation* (90° C) | % | 81.8 | 84.5 | 79.2 | 72.2 | — | 32.7 |
| Compression deformation* (120° C) | % | 10.3 | 13.9 | 19.8 | 9.8 | molten | molten |
| Recovery from deformation* (120° C) | % | 68.9 | 63.3 | 56.7 | 61.9 | — | — |
| Ease of hot cutting | five-grade scale | 3 | 4 | 4 | 1 | 4 | 5 |
| adhesion to iron** | kg/in | 1.1 | 1.9 | 2.4 | 0 | 1.5 | 0 |
| Adhesion to iron*** | kg/in | 5.8 | 11.8 | 8.0 | 4.4 | 5.5 | 0 |

*load 35 kg/cm$^2$
**90° peel strength.
***90° peel strength. Vylon 200 (trade mark of a polyester adhesive, manufactured by Toyobo Co.) is applied as an adhesive. Adhesive condition: 200° C, 2 kg/cm$^2$, 10 min.

It is apparent from Table 2 that compounds prepared by blending polyester block copolymer A with an adequate amount of polyethylene A (Examples 1 to 3) are superior in recovery from deformation to polyester block copolymer A or polyethylene A only (Comparative Example 1 or 3). The compound including a too large amount of polyethylene (Comparative Example 2) was poor in heat resistance at 90° C and ruptured during the compression creep test. On the contrary, the compounds of Examples 1 and 2 were improved in recovery from creep even at a higher temperature of 120° C.

The ease of hot cutting of the compounds according to the invention was also maintained within the permissible range. Furthermore, the adhesion was improved with or without an adhesive.

EXAMPLES 4–8

A blend of copolymer A and a polyolefin was kneaded and pelletized in a similar manner as described in Example 1. Test pieces available for the respective tests were formed, respectively, by injection molding under the above-described conditions. The conditions on measurements were the same as in Example 1. The results are shown in Table 3.

Table - 3

|  |  | Example 4 | Example 5 | Example 6 | Example 7 | Example 8 |
|---|---|---|---|---|---|---|
| Copolymer A | part by weight | 100 | 100 | 100 | 100 | 100 |
| Polyolefin | part by weight | polyethylene B 11 | polyethylene C 11 | polyethylene D 11 | polypropylene A 11 | polypropylene B 11 |
| Surface hardness | Shore D | 57 | 56 | 62 | 70 | 70 |
| Tensile strength | $kg/cm^2$ | 290 | 290 | 270 | 280 | 280 |
| Elongation | % | 700 | 700 | 660 | 670 | 670 |
| Compression deformation* (90° C) | % | 7.2 | 7.2 | 6.3 | 5.2 | 5.5 |
| Recovery from deformation* (90° C) | % | 83.5 | 81.7 | 80.9 | 80.8 | 74.2 |
| Compression deformation* (120° C) | % | 13.7 | 15.1 | 13.2 | 8.4 | 9.3 |
| Recovery from deformation* (120° C) | % | 62.4 | 59.4 | 78.5 | 68.1 | 70.0 |
| Ease of hot cutting | five-grade scale | 4 | 3 | 4 | 4 | 4 |

*load 35 $kg/cm^2$

It is apparent from Table 3 that compounds prepared by blending polyester block copolymer A with an adequate amount of polyolefin are superior in recovery from creep to polyester block copolymer A only (Comparative Example 1). Particularly, compounds blended with high-density polyethylene (Example 6) and polypropylene (Examples 7 and 8), respectively, were improved to a considerable extent in recovery from creep even at 120° C.

EXAMPLES 9–10

A blend of copolymer B and a polyolefin was kneaded and pelletized in a similar manner as described in Example 1. Test pieces available for the respective tests were formed, respectively, by injection molding under the above-described conditions. The conditions on measurements were the same as in Example 1. The results are shown in Table 4.

Table - 4

|  |  | Example 9 | Example 10 | Comparative Example 4 |
|---|---|---|---|---|
| Copolymer B | part by weight | 100 | 100 | 100 |
| Polyolefin | part by weight | polyethylene D 10 | polypropylene A 10 | — |
| Compression deformation* (120° C) | % | 5.1 | 4.8 | 4.1 |
| Recovery from deformation* (120° C) | % | 88.0 | 92.0 | 76.0 |

*load 35 $kg/cm^2$

EXAMPLES 11–12

A blend of copolymer C or D and polybutylene A was kneaded and pelletized. The resulting compound was molded into test pieces, which were subjected to measurements of various physical properties. These procedures were similar to those in Example 1. These results are shown in Table 5.

Table - 5

|  |  | Example 11 | Example 12 | Comparative Example 5 | Comparative Example 6 |
|---|---|---|---|---|---|
| Copolymer | part by weight | Copolymer C 100 | Copolymer D 100 | Copolymer C 100 | Copolymer D 100 |
| Polybutylene A | part by weight | 20 | 20 | 0 | 0 |
| Compression deformation* (120° C) | % | 10.2 | 13.3 | 9.8 | 12.8 |
| Recovery from deformation* (120° C) | % | 88.3 | 86.9 | 52.0 | 54.3 |

*load 35 $kg/cm^2$

EXAMPLES 13–14

Each blend of copolymer E and a high-density polyethylene (trade mark "Hi-zex 2100 J", manufactured by Mitsui Petroleum Chemicals Co., density 0.957 $g/cm^3$, melt index 6.5) was kneaded in a kneading extruder of screw type to obtain each compound described in Table 6. Each compound was molded by injection molding into test pieces available for the respective tests. Test pieces were subjected to measurements of various physical properties. The test pieces to be subjected to the environmental stress cracking test were made by pressing a molded piece into a sheet of 2 mm in thickness by means of a heat press and cutting the sheet into specimens having suitable dimensions. The results are shown in Table 6.

Table - 6

|  |  | Example 13 | Example 14 | Comparative Example 7 |
|---|---|---|---|---|
| Polyethylene | part by weight | 90 | 80 | 100 |
| Copolymer E | part by weight | 10 | 20 | 0 |
| Flexural modulus | $kg/mm^2$ | 54.4 | 50.9 | 71.7 |
| Tensile modulus | $kg/mm^2$ | 57.7 | 54.6 | 65.6 |
| IZOT Impact Strength | kg.cm/cm | N.B. | N.B. | N.B. |
| Hardness | Shore D | 64 | 62 | 65 |
| Environmental Streee |  |  |  |  |

Table - 6-continued

|  | | Example 13 | Example 14 | Comparative Example 7 |
|---|---|---|---|---|
| cracking resistance | hr | 25 | 70 | 4 |

It is obvious from the above results that the environmental stress cracking resistance is remarkably improved, while mechanical properties inherent to polyethylene are not substantially reduced in the composition of the invention.

The invention being thus described, it will be obvious that the same may be varied in many ways. Such variations are not to be regarde- as a departure from the spirit and scope of the invention, and all such modifications as would be obvious to one skilled in the art are intended to be included within the scope of the following claims.

What is claimed is:

1. A composition comprising an intimate mixture of an elastomer from a segmented thermoplastic polyester copolymer, and at least one polyolefin, wherein said segmented thermoplastic polyester copolymer consists essentially of (1) high-melting polyester segments, a component of which can singly form a high polymer having a melting point greater than 150° C and (2) low-melting polymer segments having a molecular weight between 400 and 6,000, a component of which has a melting or softening point of less than 80° C.

2. The composition according to claim 1 wherein an acid constituent of the polyester is mainly terephthalic acid.

3. The composition according to claim 1 wherein the polyester is mainly composed of polyethylene terephthalate and/or polybutylene terephthalate.

4. The composition according to claim 1 wherein said polyolefin has a melt index of about 0.1 to 50.

5. The composition according to claim 1 which includes from 1% to 98% by weight of the polyolefins.

6. The composition according to claim 5 which includes from 1% to 50% by weight of the polyolefins.

7. The composition according to claim 5 which includes from 15% to 50% by weight of the polyolefins.

8. The composition according to claim 1, wherein said low-melting polymer segment is included in an amount from about 5% to 80% by weight of the segmented polyester copolymer.

9. The composition according to claim 8, wherein said low-melting polymer segment is mainly composed of a polyether.

10. The composition according to claim 9, wherein a repeating unit of the polyether is mainly oxytetramethylene.

* * * * *